Figure 1:
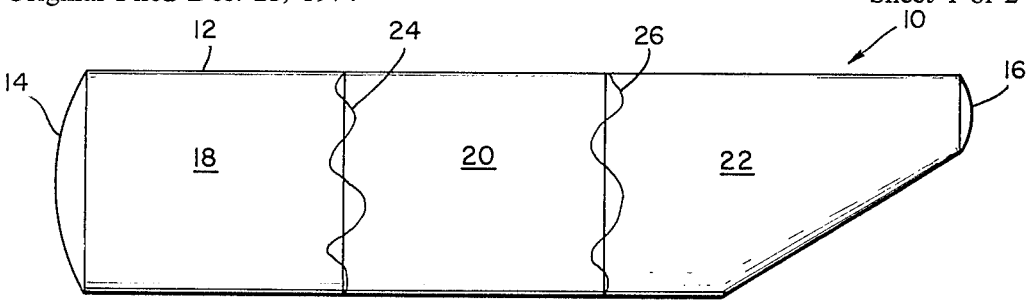
Fig. 1. (PRIOR ART)
Figure 2:
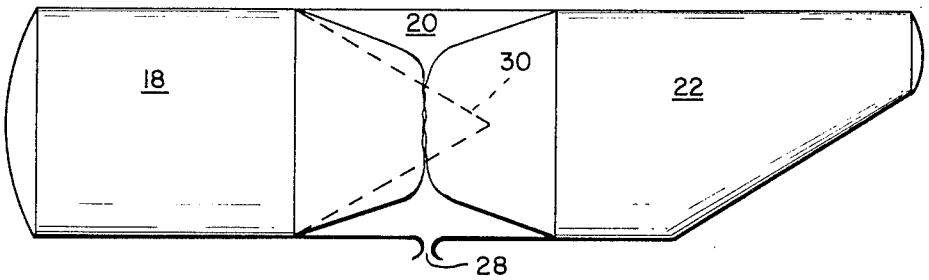
Fig. 2. (PRIOR ART)
Figure 3:
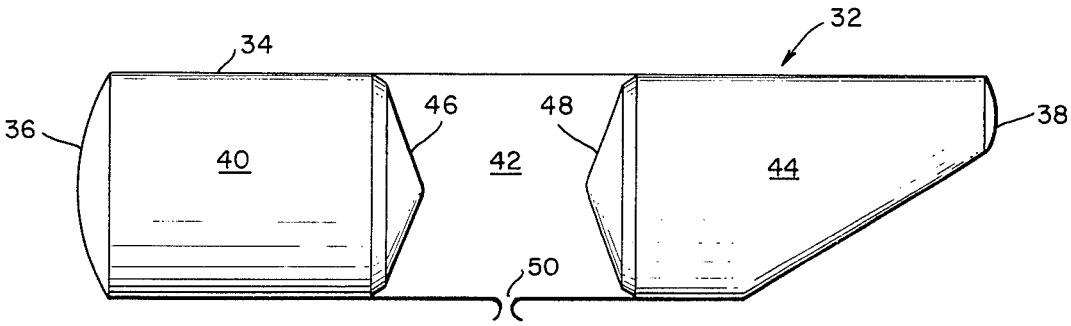
Figure 7:
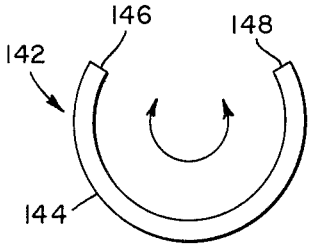
Figure 8:
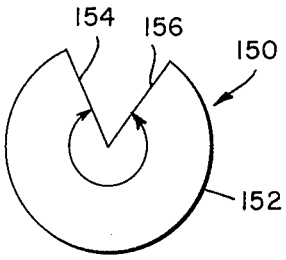
Figure 4:
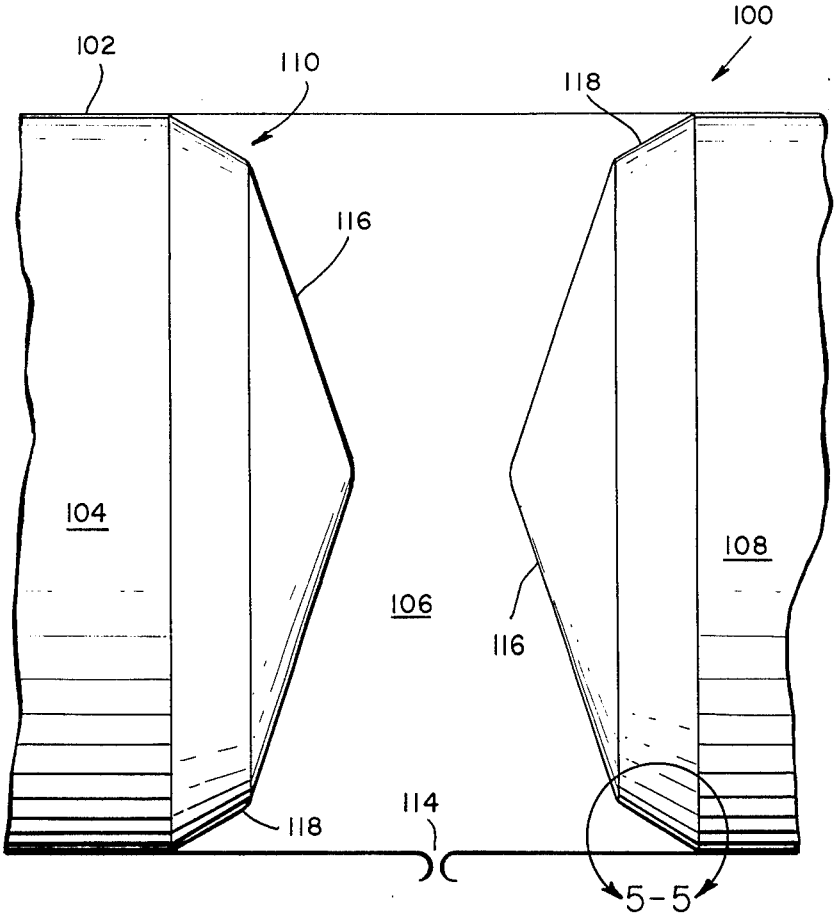
Figure 6:
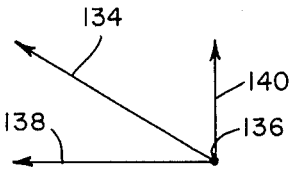
Figure 5:
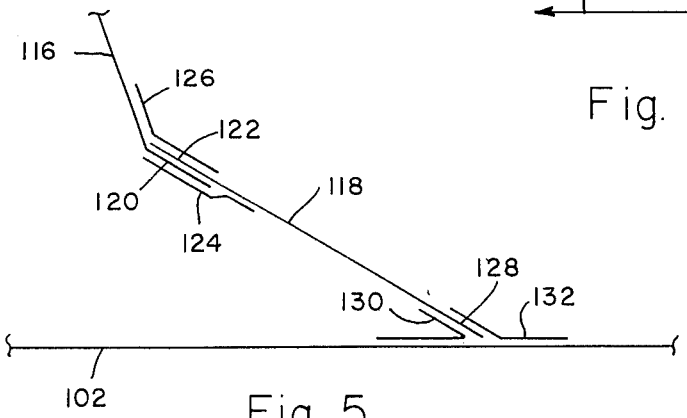

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED DECEMBER 2, 1975

941 O.G. 10

T941,023
BULKHEAD ARRANGEMENT FOR INFLATABLE APPARATUS AND FABRICATION METHOD

Randall F. White, Bricktown, N.J., assignor to The Garrett Corporation, Los Angeles, Calif.

Filed Dec. 23, 1974, Ser. No. 535,894
Int. Cl. B63b *35/34*
U.S. Cl. 114—5 F
2 Sheets Drawing. 17 Pages Specification

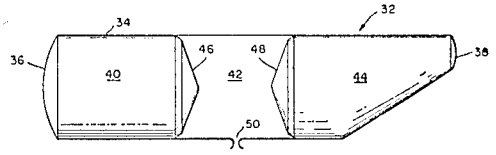

A bulkhead is disclosed for use in multi-celled inflatable apparatus such as helicopter floats and the like. The bulkhead is fabricated of a thin walled limp impervious material so that it may be easily folded, and is constructed to assure integrity of seal of the bulkhead edge to the inflatable wall. Also, when an individual compartment is breached, the bulkhead is designed to assure minimum change of fluid pressure and volume in those unbreached compartments remaining on either side of the breached compartment. The bulkhead is fabricated in a substantially dish-shaped configuration having a shallow bowl portion rimmed by a substantially steep sided edge portion of relatively short length compared to the span of the bowl portion. The bowl portion is configured as a frustum of a cone with an acute vertex angle.

BULKHEAD ARRANGEMENT FOR INFLATABLE APPARATUS AND FABRICATION METHOD

Original Filed Dec. 23, 1974